United States Patent [19]

Hardt et al.

[11] Patent Number: 5,020,768
[45] Date of Patent: Jun. 4, 1991

[54] STABILIZING APPARATUS WITH EXTENSIBLE LEGS FOR COMPUTER SYSTEM TOWER UNIT

[75] Inventors: Thomas T. Hardt, Missouri City; Steven D. Gluskoter, Houston, both of Tex.

[73] Assignee: Compao Computer Corporation, Houston, Tex.

[21] Appl. No.: 431,571

[22] Filed: Nov. 3, 1989

[51] Int. Cl.$^5$ ............................................. A47B 91/00
[52] U.S. Cl. ................................... 248/678; 312/255; 248/917; 677; 188
[58] Field of Search ............ 248/678, 919, 676, 188.8, 248/346, 677, 188, 917; 312/255

[56] References Cited

U.S. PATENT DOCUMENTS

| | | | |
|---|---|---|---|
| 2,607,649 | 8/1952 | Johnson | 312/255 X |
| 3,587,453 | 6/1971 | Klein | 248/188.8 X |
| 3,921,539 | 11/1975 | Berger | 248/188.8 X |
| 4,872,733 | 10/1989 | Tedham et al. | 312/255 |

OTHER PUBLICATIONS

Three Copies of Photographs of bottom of IBM PS/2 Model 80 Unit.
AST Computers Advertisement in PC Week, Feb. 19, 1990, pp. 68–69.
ALTEC Technology Corp., Advertisement in INFOWORLD, Feb. 5, 1990, p. 88.
Sys Technology, Inc., Advertisement in PC Week, Feb. 12, 1990, p. 100.
USM Distributors Advertisement in PC Week, Feb. 19, 1990, p. 111.

*Primary Examiner*—Alvin C. Chin-Shue
*Attorney, Agent, or Firm*—Pravel, Gambrell, Hewitt, Kimball & Krieger

[57] ABSTRACT

A computer system unit including a tower unit having a generally narrow base with respect to the depth and height of the tower unit. An extensible leg capable of extending in a generally transverse direction to the depth of the tower unit may be extended on only one side of the tower unit to prevent the tower unit from overturning. Means are provided for attaching the extensible leg to the base of the tower unit.

11 Claims, 4 Drawing Sheets

STABILIZING APPARATUS WITH EXTENSIBLE LEGS FOR COMPUTER SYSTEM TOWER UNIT

BACKGROUND OF THE INVENTION

1. Field of the Invention

The present invention relates to a stabilizing apparatus with extensible legs for a computer system tower unit.

2. Description of the Related Art

Personal computers are generally comprised of three physical parts. First, there is the main box, referred to as the system unit, that holds most of the computer components. Then there is the keyboard used for data entry. Lastly, there is the display screen. A typical arrangement of a personal computer is to have the keyboard placed in front of the system unit and the display screen perched on top of the system unit. Such an arrangement requires a considerable amount of surface area on a desk or table top. In an effort to minimize the desk surface area required for a personal computer, computer users began standing the system units vertically on the floor next to their desks or tables. The personal computer industry responded by designing system units specifically for standing vertically on the floor, which units are called tower units.

With the advent of system tower units designed to stand vertically on the floor alongside a desk came the problem of vertical stability of these generally relatively narrow tower units, because the units typically are very roughly 6" wide, 17" deep and 21" tall. One method of improving the vertical stability was to attach fixed feet or a base plate to the bottom of the unit which extended beyond the width of the tower unit on both sides of the unit, thus increasing the force required to overturn the unit. This was the simplest approach and was adopted by many manufacturers. This design did have the disadvantage of increasing the difficulty of packaging the unit for shipment or requiring the installation of the feet by the purchaser.

Another method was to attach a bar across one end of the base and affix a rotating plate near the other end of the tower base, the plate being the same thickness as the bar. The plate could be aligned with the depth of the tower unit for shipment and could be rotated approximately ninety degrees in use, enabling the plate to extend beyond the width of the unit on both sides of the unit. This latter method improved the stability of the tower when the plate was rotated perpendicularly to the depth of the tower.

Although both methods improved the stability of the tower in a free-standing floor location, the extension of the feet on both sides of the tower unit did not allow the unit to be located very close to a desk or other article which extended to the floor. The tower unit had to be spaced away the distance the feet extended beyond the side of the unit if the stabilizing feature was to be utilized at all. In those instances where it is desired to locate the tower unit very close to a desk or other article which extends to the floor, which occur more often than not, a support is needed which extends only on one side of the tower unit so that the other side can be placed close to the wall or desk.

SUMMARY OF THE INVENTION

In order to solve both the vertical stability problem of the system tower unit and the problem of an extensible support on both sides of the tower enclosure as discussed above, a stabilizing apparatus with extensible legs has been developed for a computer system tower unit which allows the extensible legs to independently slide transversely to the depth of the tower on the left, right or both sides. Alternatively, neither of the legs have to be extended if so desired. Thus, maximum versatility is obtained such that whichever side of the tower unit needs to be supported to prevent overturning, an independent extensible leg is available for this purpose.

BRIEF DESCRIPTION OF DRAWINGS

A better understanding of the invention can be had when the following detailed description of the preferred embodiment is considered in conjunction with the following drawings, in which.

DESCRIPTION OF PREFERRED EMBODIMENT

Figure 1:
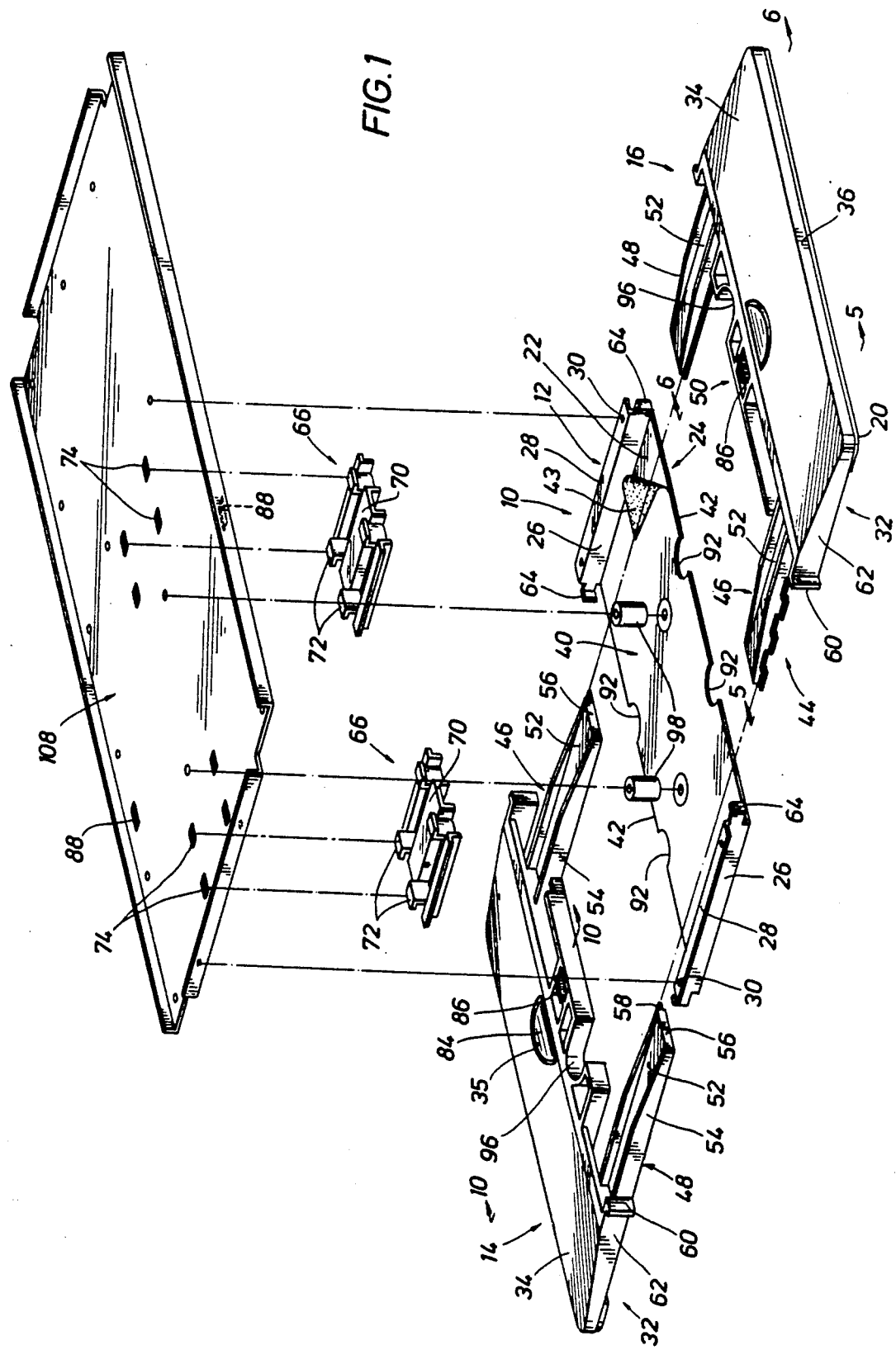
FIG. 1 is an exploded, perspective view of the stabilizing apparatus with extensible legs according to the subject invention.
Figure 2:
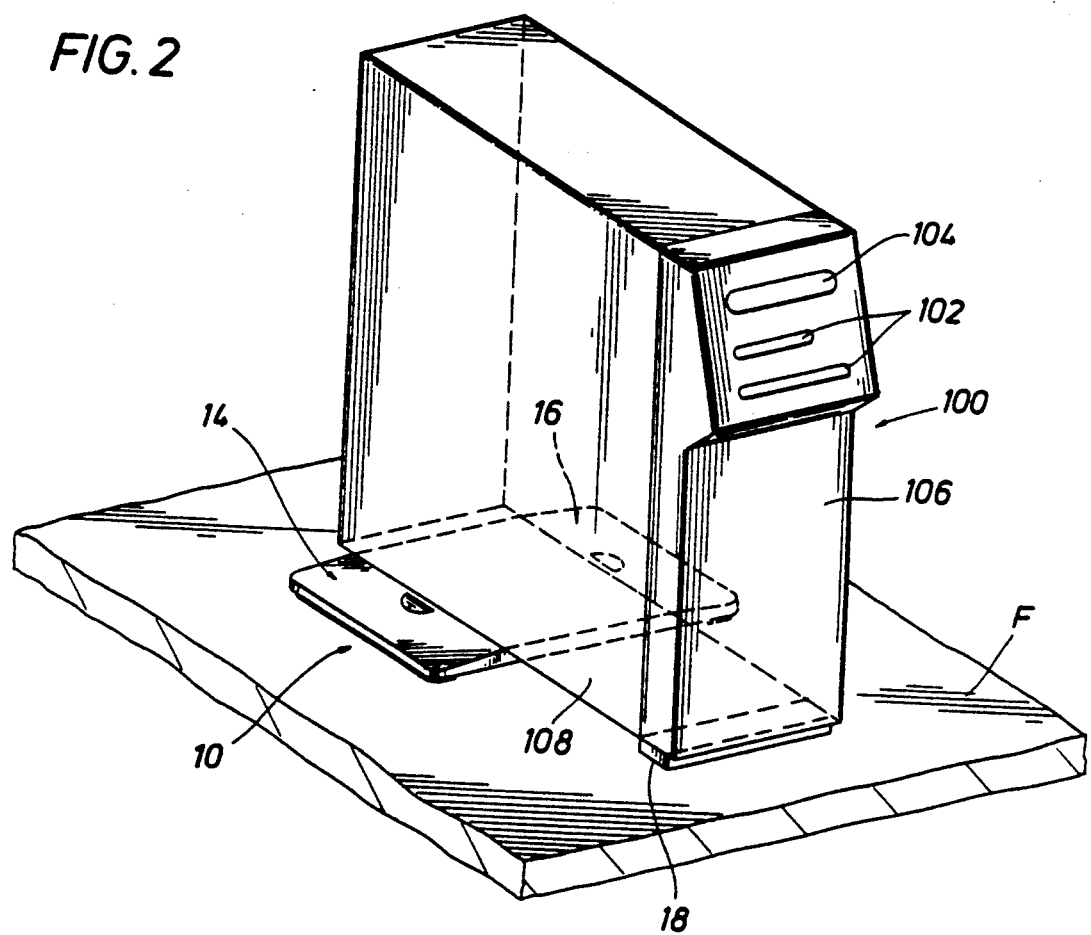
FIG. 2 is a perspective view of a system tower unit with stabilizing apparatus according to the subject invention.

A stabilizing apparatus with extensible legs which is the subject of the invention is generally illustrated in exploded view in FIG. 1 and designated by reference numeral 10. The stabilizing apparatus 10 includes three primary components, a base member 12 and two extensible legs 14 and 16, and a plurality of secondary components including two finger guides 66, two locking devices 82 (FIG. 8), two spacers 98 and a slide enhancing film 43. As shown in FIG. 2, the computer system tower unit 100 stands vertically on the floor F with the stabilizing apparatus 10 attached to the bottom 108 of the system tower unit 100. A system unit power switch opening 104 and disk drive openings 102 are conveniently located on the upper portion of a front face 106 of the system tower unit 100 for ease of accessibility by the operator. The extensible legs 14 and 16 are shown in their extended position in FIG. 2. The stabilizing apparatus 10 is located close to the rear of the system tower unit 100. The height of the stabilizing apparatus 10 is approximately equal to the height of a front leveling bar 18 which is attached to the bottom 108 of the system tower unit 100 near the front face 106 of the system unit 100. The leveling bar 18 maintains the tower unit 100 in a horizontal position with the floor F. The length of the leveling bar 18 is preferably approximately the width of the tower unit 100.

Figure 3:
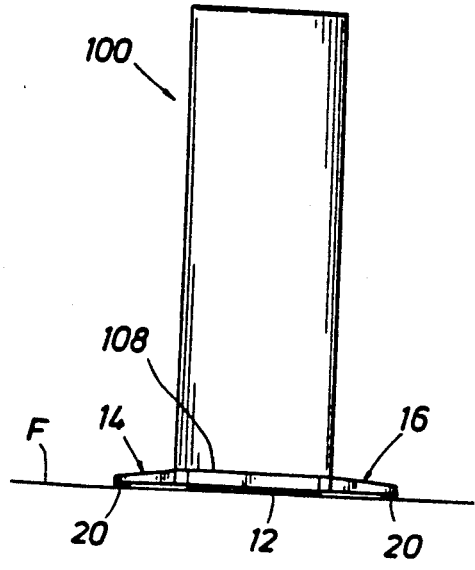
FIG. 3 is a sectional view of the rear portion of the system tower unit of FIG. 2.

FIG. 3 illustrates a sectional view of the rear portion of the tower unit 100 with the extensible legs 14 and 16 of the stabilizing apparatus 10 in extended position.

Figure 4:
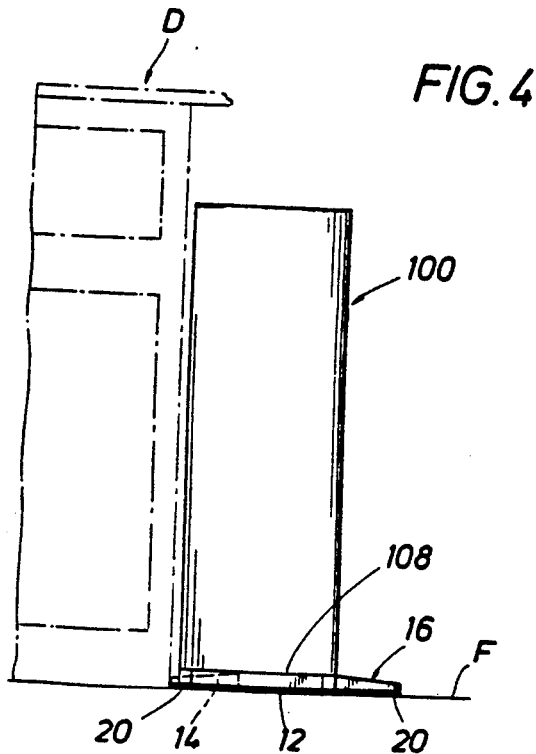
FIG. 4 is a view of a system tower unit with stabilizing apparatus according to the subject invention located close to a desk.
Figure 5:
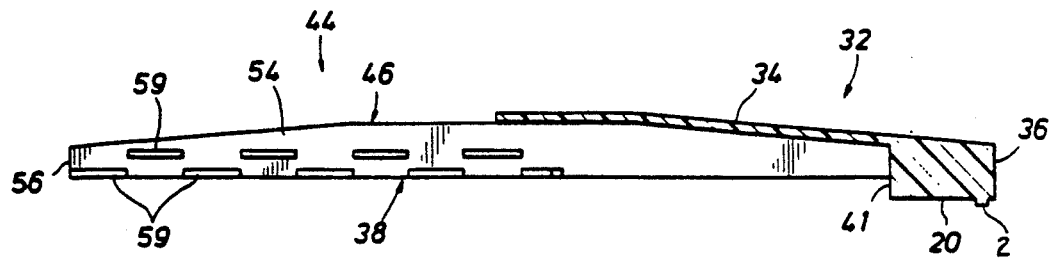
FIG. 5 is a cross sectional view as indicated in FIG. 1.
Figure 6:
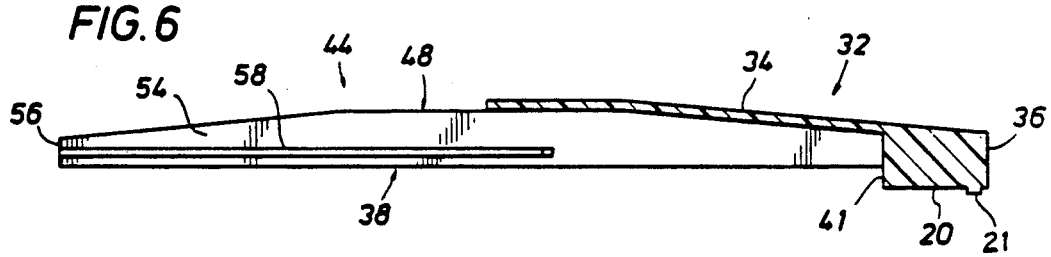
FIG. 6 is a cross sectional view as indicated in FIG. 1.

In FIG. 4, a sectional view of the tower unit 100 is shown on the side of a desk D with the extensible leg 16 in the extended position and leg 14 in the retracted position. The dashed lines illustrate the position of leg 14 in the retracted position.

Figure 9:
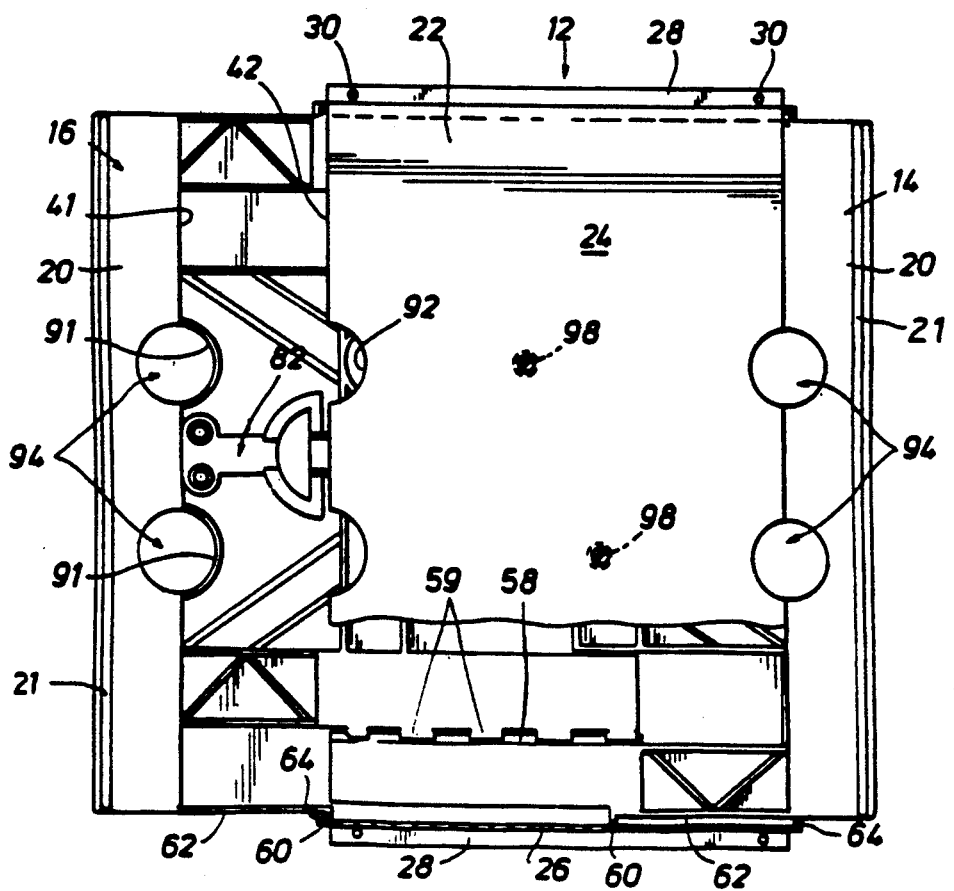
FIG. 9 is a bottom view of the stabilizing apparatus.

Referring now to FIGS. 1 and 9, the base member 12 includes a generally flat plate 22 having a smooth planar inferior surface 24 for smooth engagement with the underlying floor surface F. The base member 12 is preferably made out of a sturdy metal such as aluminum. The front and rear ends of the base member 12 have walls 26 superiorly extending perpendicularly to the flat plate 22. The walls 26 are of such a height that the appropriate portions of the legs 14 and 16 may be received in the base member 12. The base member walls 26 each have a flange 28 which is parallel to the flat plate 22 and extends outward from the front and rear ends of the flat plate 22. The flanges 28 have holes 30 for fastening the base member 12 to the bottom 108 of the tower unit 100 with fastening devices such as screws.

Referring to FIGS. 1, 5, 6, and 8, the extensible legs 14 and 16 are identical in all respects and thus are interchangeable. The legs 14 and 16 are preferably molded from a rigid structural foam having a smooth, hard finish such as General Electric LEXAN FL930, a polycarbonate with 30% glass foamed. The legs 14 and 16 include an external portion 32 having a smooth flat upper surface 34 which tapers slightly downward towards an outer edge 36. The external portion 32 comprises the portion of the extensible legs 14 and 16 which extends beyond the width of the tower bottom 108, thus broadening the base of the tower unit 100 and providing vertical stability. The external portion 32 is tapered to reduce the possibility of a person tripping on such extensions. A lower face 38 of the extensible legs 14 and 16 slides across the slide enhancing film 43 which is preferably adhesively attached to a superior face 40 of the flat plate 22 of the base member 12. The slide enhancing film 43 preferably has a low friction surface in contact with the legs 14 and 16 to reduce friction under loaded conditions. The outer portion of the lower face 38 meets a bottom foot 20 which has a height substantially the same as the thickness of the base member 12. The foot 20 has a slightly raised longitudinal projection 21 which contacts the floor F and reduces any rocking tendency of the tower unit 100. An inner edge 41 of foot 20 abuts against an outer edge 42 of the base member 12 when the legs 14 and 16 are in the retracted position to limit the retraction of the legs 14 and 16 as illustrated in FIG. 9.

Figure 7:
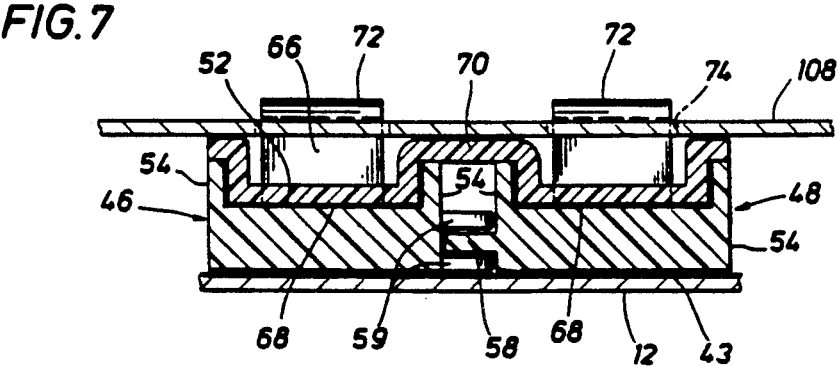
FIG. 7 is a cross sectional view of the interlocking fingers and finger guide of FIG. 1.

An internal portion 44 of the legs 14 and 16 comprises a left finger 46, a right finger 48, and a means for locking 50 the legs 14 and 16 in the extended position. As shown in FIGS. 1, 5, 6 and 7, the fingers 46 and 48 are generally straight members having a flat horizontal surface 52 with vertical side walls 54. The vertical side walls 54 begin tapering down in height at approximately mid-length of the fingers 46 and 48 to the end 56 of the fingers 46 and 48, at which point the side walls 54 are flush with the horizontal surface 52. The angle of the taper is the same as the angle of the tapered external portion 32 so that the tapered section of the side walls 54 avoids interference with the lower surface of the tapered external portion 32 of the legs 14 and 16 when both legs 14 and 16 are retracted. The left side of the right finger 48 includes a single horizontal flat bar 58 extending from the vertical side wall 54. The left side of the left finger 46 includes two horizontal rows of alternating rectangular shaped plates 59 extending from the vertical side wall 54. The vertical spacing between the rows is slightly greater than the thickness of the flat bar 58 as shown in FIG. 7. The flat bar 58 of the finger 48 of the leg 14 slidably engages between the horizontal rows of rectangular plates 59 of the finger 46 of the leg 16. Likewise, the flat bar 58 of the finger 48 of the leg 16 slidably engages between the horizontal rows of rectangular plates 59 of the finger 46 of the leg 14. As illustrated in FIG. 9, the interlocking of the fingers of the opposing legs provides alignment as the legs 14 and 16 slidably extend transversely to the depth of the tower unit 100.

The extensible legs 14 and 16 have vertical tabs 60 extending outward from vertical sides 62 of the external tapered portion 32. The vertical tabs 60 contact stops 64 of the base member 12 to limit the extension and dislocation of the legs 14 and 16 from the stabilizing apparatus 10.

Referring to FIGS. 1 and 7, the legs 14 and 16 are further maintained in proper alignment by the finger guides 66. The finger guides 66 have a generally lower surface 68 which is elevated in the center to form an inverted channel shaped section 70. The finger guides 66 have four elevated holding tabs 72 which are inserted through corresponding rectangular slots 74 in the bottom 108 of the tower unit 100. The holding tabs 72 firmly secure the finger guides 66 in place. The finger guides 66 are preferably molded from a pliant plastic to allow slight flexing of the holding tabs 72 during installation of the finger guides 66. As shown in FIG. 7, the finger guide 66 helps maintain the proper horizontal alignment between the opposing fingers 46 and 48. The slidably engaging means 58 and 59 including the vertical side walls 54 attached thereto are maintained within the inverted channel shaped section 70. The lower surfaces 68 of the finger guides 66 slidably engage with the horizontal surface 52 of the fingers 46 and 48. The slidably engaging interface also serves to restrict the legs 14 and 16 from having "play" in the vertical direction when the legs 14 and 16 are extended by limiting the gaps between the base plate 12, the legs 14 and 16 and the bottom plate 108.

Figure 10:
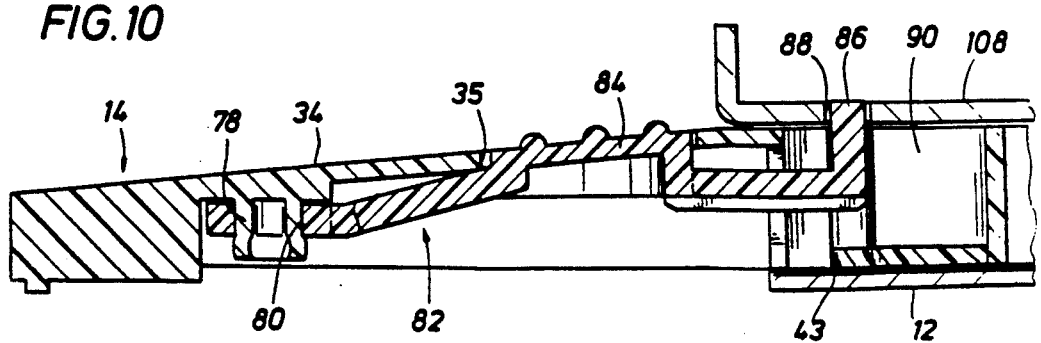
FIG. 10 is a cross sectional view as indicated in FIG. 1.
Figure 8:
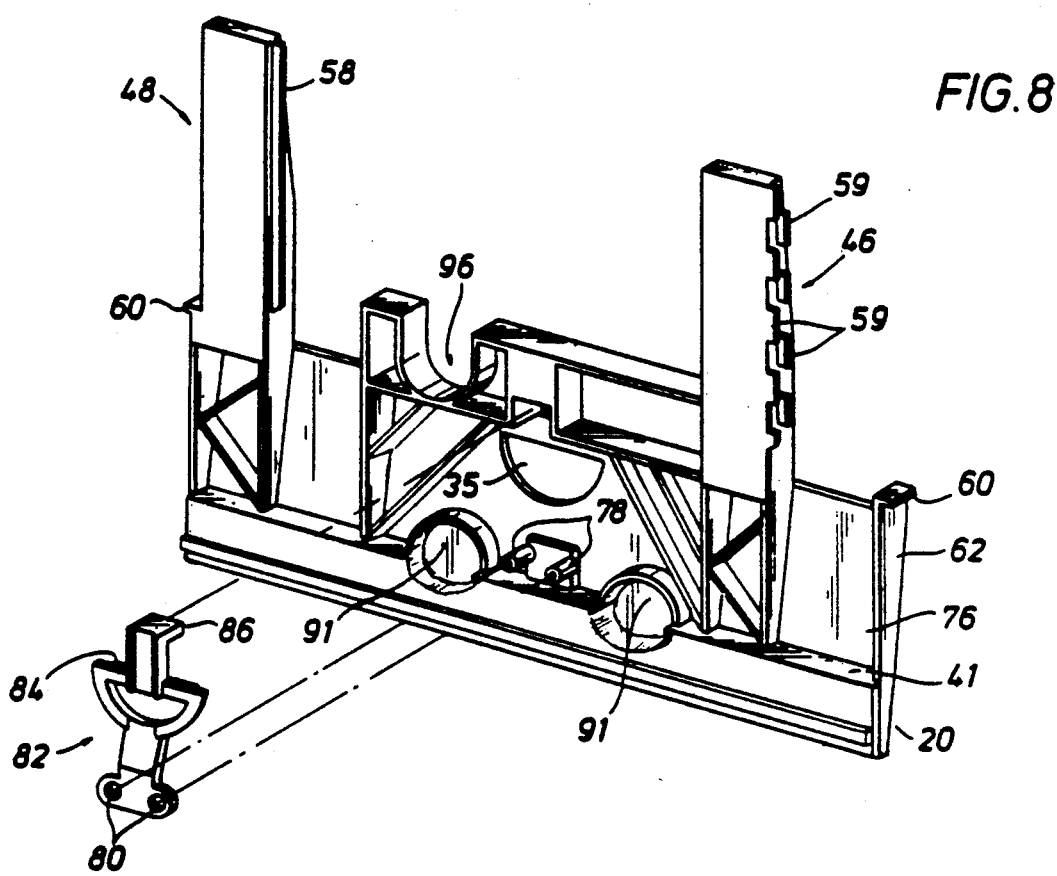
FIG. 8 is an exploded, perspective view of the locking device and bottom of a leg of FIG. 1.

As shown in FIGS. 1, 8 and 10, the tapered external portion 32 has a semi-circular aperture 35 through the surface 34 for use with a locking device 82. The locking device is preferably molded from a rigid plastic having a smooth hard finish. The bottom face 76 of the external portion 32 includes a pair of mounting posts 78 which are inserted through corresponding apertures 80 in the locking device 82. The locking device 82 is secured in place by heat staking the mounting posts 78 after mounting the locking device 82. The locking device 82 includes a semi-circular raised face 84 fitting generally flush with the surface 34 of the tapered external portion 32 after installation. The locking device 82 also includes a vertical flange 86 which extends through a flange aperture 90 in leg 14 or 16 and is biased upwardly by elastic forces of the locking device 82. The flange 86 frictionally engages the bottom 108 of the tower unit 100 to prevent the extensible legs 14 and 16 from extending from a retracted position due to gravitational forces when the tower unit 100 is horizontally positioned on its side during assembly or servicing. The vertical flange 86 engages with a corresponding rectangular slot 88 in the bottom 108 when the leg 14 or 16 is in its fully extended position to prevent inadvertent retraction of the leg 14 or 16. The semi-circular raised face 84 of the locking device 82 must be depressed to retract the fully extended leg 14 or 16.

FIG. 9 shows the bottom view of the stabilizing apparatus 10 with the leg 14 in the retracted position and the leg 16 in the extended position. Centrally located areas 94 of the bottom foot 20 are recessed and include circular walls 91 which correspond to semi-circular cutouts 92 in the base member 12. The recessed areas 94 in the legs 14 and 16 are provided as finger grips for extending the legs 14 and 16.

As shown in FIGS. 1 and 8, each leg 14 and 16 additionally includes a semi-circular walled area 96 in the internal portion 44. This area 96 encompasses a spacer 98 which maintains proper clearance between the base member 12 and the bottom 108 of the tower unit 100. The spacer 98 is held in place by a fastener inserted through the base member 12, the spacer 98 and the bottom 108.

Having described the invention above, various modifications of the techniques, procedures, material, and equipment will be apparent to those in the art. It is intended that all such variations within the scope and spirit of the appended claims be embraced thereby.

We claim:

1. A computer system unit comprising:
   a tower unit having a generally narrow width base with respect to the depth and height of said tower unit;
   two slidably extensible legs, each of said legs capable of extending to only one side of said tower unit for preventing said tower unit from overturning, said extensible legs slidably engaging and cooperatively interacting with each other; and means for attaching said extensible legs to said tower unit.

2. The computer system unit of claim 1, wherein each of said extensible legs retracts substantially within the area of said base of said tower unit to permit said tower unit to be placed substantially adjacent to a wall or side of a desk on which side said leg is retracted.

3. The computer system unit of claim 1, further comprising:
   a retracting locking means for locking each of said legs in the fully extensible position.

4. The computer system unit of claim 1, further comprising:
   an extending resisting means for resisting each of said legs from extending from the retracted position.

5. The computer system unit of claim 1, further comprising:
   at least one guide member for guiding said extensible legs while extending and retracting said legs, said guide member attaching to said base of said tower unit.

6. The computer system unit of claim 1, wherein said means for attaching said extensible legs to said tower unit comprises:
   a base member having a generally planar lower surface with opposing first and second side walls generally perpendicular to said planar lower surface, said opposing first and second side walls attaching to said base of said tower unit in a direction transverse to the depth of said tower unit.

7. The computer system unit of claim 6, further comprising:
   a plurality of stops attached to said base member and a corresponding plurality of vertical tabs attached to said extensible legs, said vertical tabs contacting with said stops for preventing said extensible legs from dislocating with said tower unit.

8. The computer system unit of claim 1, wherein said extensible legs are identical to each other.

9. The computer system unit of claim 1, wherein each of said extensible legs has a length greater than one-half of the width of said tower unit.

10. A stabilizing apparatus for a computer system tower unit, wherein the tower unit has a generally narrow base with respect to the depth and height of the tower unit, comprising:
    a base member having a generally planar lower surface with opposing first and second side walls generally perpendicular to said plane lower surface, said opposing first and second side walls attaching to the base of the tower unit in a direction transverse to the depth of the tower unit;
    two slidably extensible legs received between the base of the tower unit and said generally planar lower surface of said base member, each of said legs capable of extending to only one side of the tower unit for preventing said tower unit from overturning, each of said legs has a length greater than one-half of the width of the tower unit, wherein said legs slidably engage and cooperatively interact with each other and wherein each of said legs retracts substantially within the area of the base of the tower unit;
    a plurality of stops attached to said base member and a corresponding plurality of vertical tabs attached to said extensible legs, said vertical tabs contacting with said stops for preventing said extensible legs from dislocating with the tower unit; and
    at least one guide member for guiding said extensible legs while extending and retracting said legs, said guide member attaching to the base of the tower unit.

11. The stabilizing apparatus of claim 10, wherein said extensible legs are identical to each other.

* * * * *

UNITED STATES PATENT AND TRADEMARK OFFICE
CERTIFICATE OF CORRECTION

PATENT NO.    :   5,020,768
DATED         :   June 4, 1991
INVENTOR(S)   :   Thomas T. Hardt and Steven D. Gluskoter It is certified that error appears in the above-identified patent and that said Letters Patent is hereby corrected as shown below:

On The Title Page:    under Assignee, please delete "Compao" and insert --Compaq--.

In column 6, line 32, please delete "plane" and insert --planar--.

Signed and Sealed this

Thirteenth Day of October, 1992

Attest:

DOUGLAS B. COMER

*Attesting Officer*          *Acting Commissioner of Patents and Trademarks*